United States Patent
Kazamaki et al.

[11] 3,817,602
[45] June 18, 1974

[54] PHOTOGRAPHIC OBJECTIVE PARTICULARLY FOR SUPERMICROFILM

[75] Inventors: Tomokazu Kazamaki; Koichi Kobayashi, both of Tokyo, Japan

[73] Assignee: Asahi Kogaku Kogyo Kabushiki Kaisha, Tokyo-to, Japan

[22] Filed: July 3, 1972

[21] Appl. No.: 268,472

[30] Foreign Application Priority Data
July 9, 1971  Japan.............................. 46-50884

[52] U.S. Cl................................. 350/214, 350/214
[51] Int. Cl. ........................................... G02b 9/64
[58] Field of Search........................... 350/214, 176

[56] References Cited
UNITED STATES PATENTS
3,506,340   4/1970   Kinoshita............................ 350/214
3,551,030   12/1970  Gilkeson et al................. 350/214 X

*Primary Examiner*—John K. Corbin
*Attorney, Agent, or Firm*—Steinberg & Blake

[57] ABSTRACT

A photographic objective particularly adapted for use during exposure or projection of supermicrofilm. The objective has a viewing angle on the order of ±12° with a relatively large aperture having an F-number of 1.4, the magnification being on the order of 1/100. At the same time the objective has highly favorable aberration conditions and is well-suited to be used with supermicrofilm.

2 Claims, 10 Drawing Figures

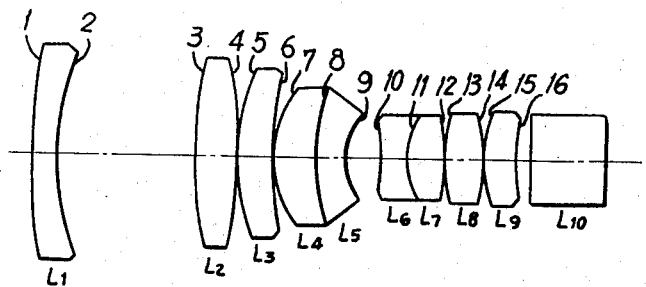
FIG. 1
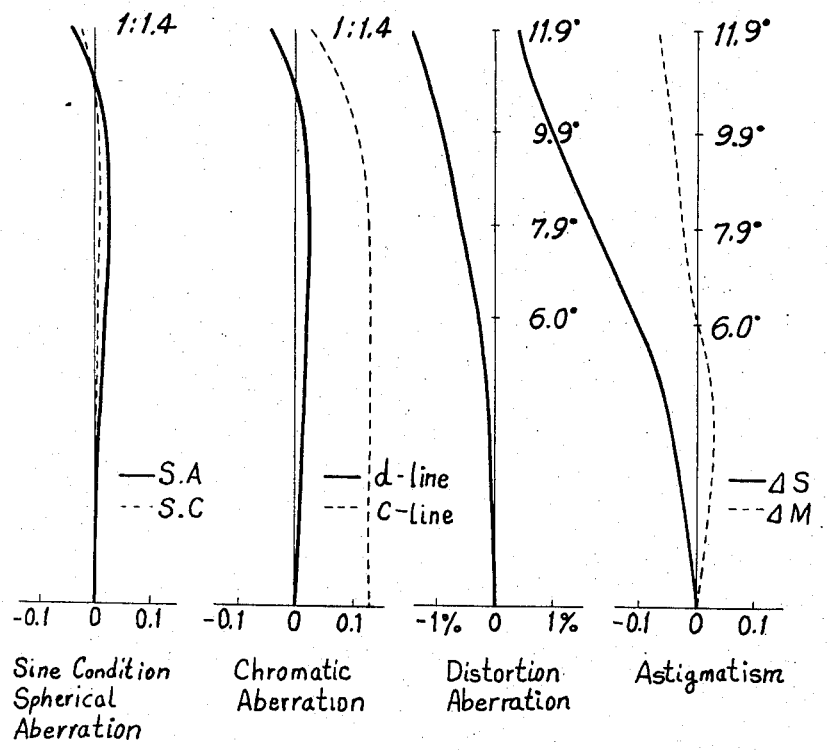

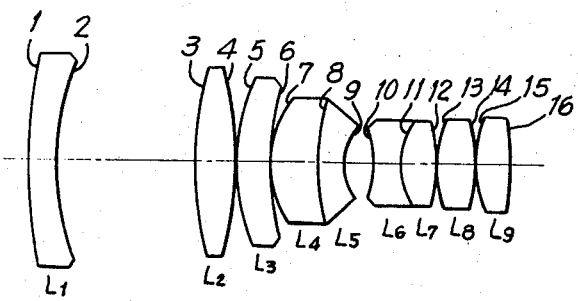
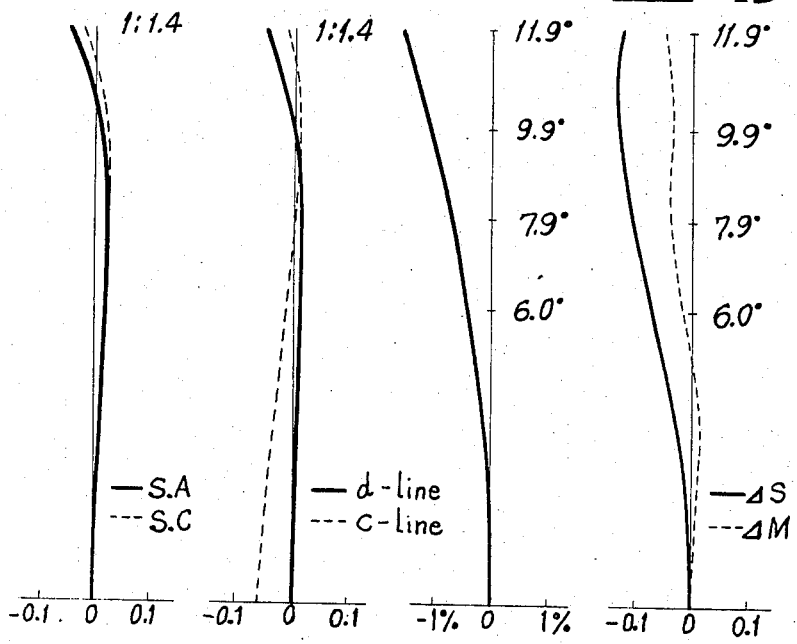

PHOTOGRAPHIC OBJECTIVE PARTICULARLY FOR SUPERMICROFILM

BACKGROUND OF THE INVENTION

The present invention relates to photographic objectives.

In particular, the present invention relates to that type of objective which is used either in order to expose or in order to project supermicrofilm.

Conventional objectives of this type generally have a viewing angle ranging from approximately ±3° to about ±6° and they have a magnification of at least approximately 1/30, the objective when used as a projecting lens having a magnification which is not larger than 30.

However, conventional objectives of this type are difficult to design with good aberration characteristics, and in addition it is difficult to provide for objectives of this type a relatively large aperture. Moreover, although a magnification of substantially less than 1/30 is desirable, such a range of magnification has not yet been achieved with conventional objectives of this type.

SUMMARY OF THE INVENTION

It is accordingly a primary object of the present invention to provide a photographic objective which will avoid the above problems.

In particular, it is an object of the invention to provide a photographic objective which will have a relatively large aperture such as an aperture having an F-number of 1.4.

Also it is an object of the present invention to provide a photographic objective of the above type which has a magnification on the order of 1/100.

In addition, it is an object of the present invention, while maintaining the latter characteristics, to still provide an objective having highly favorable aberration characteristics.

Thus, it is especially an object of the present invention to provide a photographic objective which is particularly well suited for exposing or projecting supermicrofilm.

Thus, in accordance with the present invention there is provided a photographic objective to be used during exposure or projection of supermicrofilm, and this objective has at least nine lenses designated from front to rear as $L_1$ - $L_9$, respectively, with lenses $L_4$ and $L_5$ having a common surface of radius $r_8$ and with lenses $L_6$ and $L_7$ having a common surface of radius $r_{11}$, with the objective according to one embodiment terminating at its rear in a cover glass, which is not used in a second embodiment of the invention, and with the objective of the invention having in the embodiment with the cover glass the data of Table I, below, and in the embodiment without the cover glass the data of Table III set forth below.

BRIEF DESCRIPTION OF DRAWINGS

The invention is illustrated by way of example in the accompanying drawings which form part of this application and in which:

FIG. 1 is a diagrammatic representation of a first embodiment of a photographic objective according to the invention;

FIGS. 2A–2D respectively illustrate graphically various characteristics of the objective of FIG. 1;

FIG. 3 is a schematic representation of a second embodiment of a photographic objective according to the invention; and FIGS. 4A–4D respectively illustrate graphically characteristics of the objective of FIG. 3.

DESCRIPTION OF PREFERRED EMBODIMENTS

Referring to FIG. 1, the embodiment of an objective according to the invention which is illustrated therein includes ten lenses designated from front to rear as $L_1$-$L_{10}$, respectively. Starting with the front lens which is directed toward the larger conjugate, the first lens $L_1$ is a negative lens, while the second lens $L_2$ is a biconvex position lens spaced by considerable distance along the principal axis from the first lens $L_1$. The third lens $L_3$ is a positive meniscus lens. The lenses $L_1$-$L_3$ have the front and rear surfaces illustrated. Thus, $L_1$ has the front surface 1 and rear surface 2, lens $L_2$ has the front surface 3 and rear surface 4, and lens $L_3$ has front surface 5 and rear surface 6.

The fourth and fifth lenses $L_4$ and $L_5$ directly contact each other at their common surface 8 where they are cemented together, the lens $L_4$ having the front surface 7 while the lens $L_5$ has the rear surface 9. These air-contacting refractive surfaces 7 and 9 of the joined lenses $L_4$ and $L_5$ are both convex with respect to the first lens $L_1$.

The objective of FIG. 1 includes a sixth lens $L_6$ which is a biconcave negative lens and a seventh lens $L_7$ which is a positive lens cemented directly to the lens $L_6$, so that these lenses have a common surface 11 with the lens $L_6$ having an exposed front surface 10 while the lens $L_7$ has an exposed rear surface 12.

The eighth lens $L_8$ is a positive lens, while the ninth lens $L_9$ is also a positive lens.

At the rear of all of these lens elements the objective of FIG. 1 is provided with a cover glass $L_{10}$ which is optional.

With this particular objective of FIG. 1 it is possible to provide a high resolution with an F-number of 1.4 and a viewing angle of 24°.

The objective of FIG. 1 satisfies the following conditions:

1. $0.03 < n_{11} - n_{10} < 0.1$
   $0.37f < r_{11} < 0.7f$
2. $0.3f < r_9 < 0.4f$
   $0.50f < -r_{10} < 1.8f$
3. $0.10 < \beta_{12} < 0.42$
   $0.40 < \beta_{14} < 0.86$ where, $f$ = focal length of the entire optical system, $r_9, r_{10}, r_{11}$ are respectively equal to the radii of curvature of refractive surfaces 9-11, respectively, $n_{10}, n_{11}$ are respectively equal to the d-line refractive indices of the lenses $L_6$ and $L_7$, $\beta_{12}$ and $\beta_{14}$ are respectively the power of the partial optical system situated in front of refractive surfaces 12 and 14, the entire system being assumed to have a power of one or unity.

Referring to the above conditions, the condition (1) takes care of the situation where an insufficiently corrected high order of spherical aberration will be treated in a satisfactory manner at the refractive surface 11, which is the common surface between the joined lenses $L_6$ and $L_7$. As a result of the relationship (1) the absolute quantity of spherical aberration can be reduced over the full aperture range.

In the event that $n_{11} - n_{10}$, or in other words the difference between the refractive indices on both sides of the common surface 11 between the lenses $L_6$ and $L_7$, is less than 0.03 and the radius of curvature $r_{11}$ of refractive surface 11 is greater than 0.70f, then the extent to which correction is made for higher order spherical aberration is far too small and is without effect. On the other hand, when $n_{11} - n_{10}$ is greater than 0.1 and $r_{11}$ is less than 0.37f, both the higher order spherical aberration as well as the lower order spherical aberration will be increased at the surface 11. Therefore, it will not be possible to correct the peripheral spherical aberration by the use of other lens elements, or otherwise the positive, annular spherical aberration will reach a large value which will lead to a reduction in the resolution of the image.

As may be seen from condition (2) when $r_9$ is less than 0.3f there will be an increase in the higher order coma aberration, while when the value of $r_9$ is greater than 0.4f, astigmatism will be corrected to a lesser extent, so that it will be difficult to maintain a balance in the total of the aberrations.

As may further be seen from condition (2) when the value of $-r_{10}$ is less than 0.50f, the extent of coma aberration and, particularly, sagittal coma will become too great to be acceptable, while if $-r_{10}$ is greater than 1.8f, then the Petzval sum will be undesirably increased and the back focus will be reduced.

Condition (3) is provided in order to correct astigmatism which develops in order to compensate the coma aberration correction carried out in accordance with condition (2). In a conventional system a value corresponding to $\beta_{12}$ is selected in such a way as to be negative. However, according to the present invention the value $\beta_{12}$ is positive, and the same is true of $\beta_{14}$. These values $\beta_{12}$ and $\beta_{14}$ are selected in this way so as to become effective in making the astigmatism coefficient provided by each of the immediately subsequent positive lenses negative or almost zero. On the other hand, when $\beta_{12}$ and $\beta_{14}$ are both less than 0.10 and 0.40, respectively, it is not possible to correct the astigmatism, while when both $\beta_{12}$ and $\beta_{14}$ are greater than 0.42 and 0.86, respectively, correction for spherical aberration will not be sufficient.

Thus, it is a characteristic of the present invention that it enables coma aberration to be corrected by increasing the radius of curvature as set forth above, while preventing an increase in the Petzval sum by situating the negative first lens $L_1$ at a large distance from the succeeding elements. In addition, with the present invention it is possible to increase the peripheral light quantity by making use of the pupil aberration of the first negative lens.

Specific embodiments of the invention are set forth in the tables which follow. In Table I which follows, the several lenses of FIG. 1 are designated in sequence in the first column, while the radii of curvature of the several lens surfaces of FIG. 1 are set forth in the second column, with the thicknesses of the several lens elements being indicated by t with a suitable subscript and the distance from one lens to the next is designated by d with a suitable subscript. In the glass constants, the column designated n represents the refractive index for the particular lens at the d-line, while the last column y represents the Abbe number.

TABLE I

| Lens | Focal Length=100mm | Aperture Ratio 1:1.4 | Glass Constants | |
|---|---|---|---|---|
| | | | $n$ | $\overline{\nu}$ |
| $L_1$ | $r_1$=+545.33 mm | $t_1$=12.50mm | 1.51633 | 64.1 |
| | $r_2$=+148.66 mm | | | |
| | $r_3$=+382.34 mm | $d_1$=77.51mm | | |
| $L_2$ | | $t_2$=20.00mm | 1.77250 | 49.6 |
| | $r_4$=−423.95 mm | $d_2$=1.25mm | | |
| | $r_5$=+119.16 mm | | | |
| $L_3$ | | $t_3$=20.00mm | 1.77250 | 49.6 |
| | $r_6$=+222.00 mm | $d_3$=1.25mm | | |
| | $r_7$=+59.61 mm | | | |
| $L_4$ | $r_8$=+104.63 mm | $t_4$=22.00mm | 1.77250 | 49.6 |
| $L_5$ | | $t_5$=14.38mm | 1.80518 | 25.5 |
| | $r_9$=+35.28 mm | $d_4$=18.75mm | | |
| | $r_{10}$=−144.41mm | | | |
| $L_6$ | | $t_6$=15.00mm | 1.72151 | 29.3 |
| | $r_{11}$=+41.72 mm | | | |
| $L_7$ | $r_{12}$=−813.93 mm | $t_7$=20.00mm | 1.80400 | 46.6 |
| | $r_{13}$=+279.35mm | $d_5$=1.25mm | | |
| $L_8$ | | $t_8$=19.00mm | 1.81554 | 44.4 |
| | $r_{14}$=−183.49mm | $d_6$=1.25mm | | |
| | $r_{15}$=+72.88 mm | | | |
| $L_9$ | | $t_9$=18.13mm | 1.80440 | 39.6 |
| | $r_{16}$=+122.05 mm | $d_7$=7.50mm | | |
| | $r_{17}$=∞ | | | |
| $L_{10}$ | | $t_{10}$=40.00mm | 1.52600 | 58.8 |
| | $r_{18}$=∞ | | | |
| | (image surface) | | | |

Thus, the above Table I provides data for a specific embodiment of an objective which is illustrated in FIG. 1. Table II which follows is a Table of von Seidel coefficients for the embodiment of FIG. 1 which has the data of Table I above. In Table II the successive surfaces of the successive lenses are designated in the first column. The position of the object is −89.4f, the position of the entrance pupil is 1.58f, and the magnification is 1/90. The column $S_1$ designates spherical aberration, the column $S_2$ designates coma aberration, the column $S_3$ designates astigmatism, the column P designates the Petzval coefficient, and the column $S_5$ designates distortion aberration.

TABLE II von Seidel Coefficients

| Surface | $S_1$ | $S_2$ | $S_3$ | P | $S_5$ |
|---|---|---|---|---|---|
| 1 | +0.002 | +0.006 | +0.023 | +0.062 | +0.318 |
| 2 | −0.238 | +0.095 | −0.038 | −0.229 | +0.106 |
| 3 | +0.094 | +0.062 | +0.041 | +0.114 | +0.103 |
| 4 | +0.053 | −0.135 | +0.347 | +0.103 | −1.150 |
| 5 | +0.080 | +0.026 | 0.008 | +0.366 | +0.121 |
| 6 | +0.003 | −0.032 | +0.304 | −0.196 | −1.1032 |
| 7 | +0.057 | +0.008 | +0.001 | +0.731 | +0.103 |
| 8 | −0.004 | +0.010 | −0.027 | +0.010 | +0.046 |
| 9 | −0.161 | −0.119 | −0.087 | −1.264 | −0.996 |
| 10 | −0.180 | +0.337 | −0.631 | −0.290 | +1.723 |
| 11 | +0.065 | +0.085 | +0.109 | +0.064 | +0.224 |
| 12 | +0.024 | −0.091 | +0.346 | +0.055 | −1.516 |
| 13 | −0.003 | +0.033 | −0.339 | +0.161 | +1.845 |
| 14 | +0.237 | −0.0228 | +0.219 | +0.245 | −0.447 |
| 15 | −0.001 | +0.030 | −0.671 | +0.612 | +1.336 |
| 16 | +0.105 | −0.230 | +0.503 | −0.365 | −0.302 |
| 17 | −0.143 | +0.147 | −0.151 | +0.000 | +0.155 |
| SUM | −0.010 | +0.003 | −0.042 | +0.176 | +0.639 |

Referring to FIGS. 2A–2D, the graphs illustrated therein show curves corresponding to the various aberrations. Thus, the graph of FIG. 2A shows the curves for the sine condition, which is the solid line curve and the spherical aberration which is the dotted line curve. It will be noted that these aberrations are maintained exceedingly small.

The second graph of FIG. 2B illustrates the chromatic aberration for the embodiment of FIG. 1 along the d-line, which corresponds to the solid line curve of the second graph of FIG. 2 and the c-line which is represented by the dotted line curve of FIG. 2B. It will be noted that these aberrations also are maintained within acceptable valves.

The same is true of the distortion aberration shown in FIG. 2C and the astigmatism shown for $\Delta S$ with the solid line in the graph of FIG. 2D and for $\Delta M$ with the dotted line in the graph of FIG. 2.

In the embodiment of the invention which is illustrated in FIG. 3, the cover glass at the rear of the objective is omitted. The remaining lenses have the same general arrangement as is the case with FIG. 1, as is apparent from comparing FIG. 3 with FIG. 1, although the lenses are different in their actual specific characteristics. The specific embodiment of FIG. 3 has the data shown below in Table III. Thus, in Table III which follows to provide specific data for the embodiment of FIG. 3, the first column designates the several lenses $L_1$ – $L_9$, respectively, while the radii of curvature of the successive lens surfaces are designated in the second column. The third column designates on the one hand the thickness of the successive lenses along the principal axis, this thickness being designated by $t$ with a suitable subscript, while the distance from one lens to the next is designated by $d$ with a suitable subscript. The glass constants are designated in the last two columns with the refractive index $n$ being along the $d$-line while the last column $v$ designates the Abbe number of the glass.

TABLE III

| Lens | Focal Length = 100 mm | Aperture Ratio 1:1.4 | Glass Constants | |
|---|---|---|---|---|
| | | | $n$ | $v$ |
| $L_1$ | $r_1$=+521.24 mm | $t_1$=12.46mm | 1.51112 | 60.5 |
| | $r_2$=+140.57 mm | $d_1$=77.28mm | | |
| $L_2$ | $r_3$=+223.45 mm | $t_2$=19.94mm | 1.77250 | 49.6 |
| | $r_4$=−480.98 mm | $d_2$=1.25mm | | |
| $L_3$ | $r_5$=+101.51 mm | $t_3$=19.94mm | 1.77250 | 49.6 |
| | $r_6$=+160.04 mm | $d_3$=1.25mm | | |
| $L_4$ | $r_7$=+63.27 mm | $t_4$=24.43mm | 1.77250 | 49.6 |
| | $r_8$=+132.50 mm | | | |
| $L_5$ | $r_9$=+32.39 mm | $t_5$=14.33mm | 1.80518 | 25.5 |
| | $r_{10}$=−79.20 mm | $d_4$=15.58mm | | |
| $L_6$ | $r_{11}$=+43.39 mm | $t_6$=14.96mm | 1.72151 | 29.3 |
| $L_7$ | $r_{12}$=−259.15 mm | $t_7$=19.94mm | 1.80400 | 46.6 |
| | $r_{13}$=+191.36 mm | $d_5$=1.25mm | | |
| $L_8$ | $r_{14}$=−384.24 mm | $t_8$=18.95mm | 1.80400 | 46.6 |
| | $r_{15}$=+85.76 mm | $d_6$=1.25mm | | |
| $L_9$ | $r_{16}$=+1836.31 mm | $t_9$=17.45mm | 1.83400 | 37.2 |

The von Seidel coefficients for the embodiment of FIG. 3 are set forth in Table IV which follows below. Thus, in Table IV the successive lens surfaces are designated in the first column while the various headings at the successive columns have the same significance as in the case of Table II above. In Table IV, the position of the object is −89.2f, the position of the entrance pupil is 1.15f, and the magnification is 1/90.

TABLE IV von Seidel Coefficients

| Surface | $S_1$ | $S_2$ | $S_3$ | P | $S_5$ |
|---|---|---|---|---|---|
| 1 | +0.002 | +0.006 | +0.023 | +0.065 | +0.308 |
| 2 | −0.278 | +0.126 | −0.057 | −0.241 | +0.135 |
| 3 | +0.237 | +0.050 | +0.010 | +0.195 | +0.043 |
| 4 | +0.107 | −0.244 | +0.553 | +0.091 | −1.459 |
| 5 | +0.046 | +0.013 | +0.004 | +0.429 | +0.126 |
| 6 | +0.002 | −0.026 | +0.356 | −0.272 | −1.140 |
| 7 | −0.076 | −0.034 | −0.015 | +0.689 | +0.302 |
| 8 | −0.012 | +0.021 | −0.040 | +0.008 | +0.060 |
| 9 | −0.099 | −0.099 | −0.099 | −1.377 | −1.469 |
| 10 | −0.339 | +0.497 | −0.728 | −0.529 | +1.844 |
| 11 | +0.056 | +0.087 | +0.136 | +0.061 | +0.307 |
| 12 | +0.029 | −0.092 | +0.295 | +0.172 | −1.496 |
| 13 | +0.000 | +0.005 | −0.276 | +0.233 | +2.259 |
| 14 | +0.094 | −0.162 | +0.277 | +0.116 | −0.637 |
| 15 | −0.001 | +0.024 | −0.596 | +0.530 | +1.598 |
| 16 | +0.219 | −0.176 | +0.142 | −0.025 | −0.094 |
| SUM | −0.012 | −0.002 | −0.015 | +0.145 | +0.651 |

The aberration curves of the embodiment of FIG. 3 are illustrated in FIGS. 4A–4D. The several curves of the graphs of FIGS. 4A–4D correspond to the curves shown in FIGS. 2A–2D for the embodiment of FIG. 1. Thus in the graph of FIG. 4A the sine condition and spherical aberration curves are respectively designated for the embodiment of FIG. 3 with the solid and dotted lines, in FIG. 4B the chromatic aberration curves are represented with the solid curve representing the chromatic aberration along the small $d$-line while the dotted line curve represents the chromatic aberration along the small $c$-line. The distortion aberration is illustrated in FIG. 4D, while the two astigmatism curves of FIG. 4D correspond to those of FIG. 2, and it becomes apparent from FIG. 4D that the astigmatism with the embodiment of FIG. 3 is improved over that of FIG. 1 whereas the remaining aberrations are if anything also improved over that of FIG. 1, so that the embodiment of FIG. 3 without the rear cover glass achieves the objects of the invention with even less distortion and aberration than is the case with the embodiment of FIG. 1.

The aberration curves illustrated in FIGS. 2A–2D and FIGS. 4A–4D are obtained in the case of F=100.

What is claimed is:

1. A photographic objective to be used during exposure or projection of supermicrofilm, said objective having from front to rear a series of 10 lenses $L_1$–$L_{10}$, of which the rear lens $L_{10}$ is a cover glass, with lenses $L_4$ and $L_5$ having a common surface of radius $r_8$ and with lenses $L_6$ and $L_7$ having a common surface of radius $r_{11}$, wherein for a focal length of 100 mm and for an aperture ratio of 1:1.4, the objective has the data of the following Table I, in which the radii of curvature of the sequential lens surfaces are set forth in the second column, with the thickness of the several lens elements being indicated by $t$ and the distance from one lens to the next by $d$, and the glass constants $n$ representing the refractive index at the $d$-line while $v$ represents the Abbe number:

TABLE I

| Lens | Focal Length=100mm | Aperture Ratio 1:1.4 | Glass Constants | |
|---|---|---|---|---|
| | | | $n$ | $v$ |
| $L_1$ | $r_1=+545.33$ mm | | | |
| | | $t_1=12.50$mm | 1.51633 | 64.1 |
| | $r_2=+148.66$ mm | | | |
| | | $d_1=77.51$mm | | |
| | $r_3=+382.34$ mm | | | |
| $L_2$ | | $t_2=20.00$mm | 1.77250 | 49.6 |
| | $r_4=-423.95$ mm | | | |
| | | $d_2=1.25$mm | | |
| | $r_5=+119.16$ mm | | | |
| $L_3$ | | $t_3=20.00$mm | 1.77250 | 49.6 |
| | $r_6=+222.00$ mm | | | |
| | | $d_3=1.25$mm | | |
| | $r_7=+59.61$ mm | | | |
| $L_4$ | | $t_4=22.00$mm | 1.77250 | 49.6 |
| | $r_8=+104.63$ mm | | | |
| $L_5$ | $r_9=+35.28$ mm | $t_5=14.38$mm | 1.80518 | 25.5 |
| | | $d_4=18.75$mm | | |
| | $r_{10}=-144.41$mm | | | |
| $L_6$ | | $t_6=15.00$mm | 1.72151 | 29.3 |
| | $r_{11}=+41.72$ mm | | | |
| $L_7$ | | $t_7=20.00$mm | 1.80400 | 46.6 |
| | $r_{12}=-813.93$ mm | | | |
| | | $d_5=1.25$mm | | |
| | $r_{13}=+279.35$mm | | | |
| $L_8$ | | $t_8=19.00$mm | 1.81554 | 44.4 |
| | $r_{14}=-183.49$mm | | | |
| | | $d_6=1.25$mm | | |
| | $r_{15}=+72.88$ mm | | | |
| $L_9$ | | $t_9=18.13$mm | 1.80400 | 39.6 |
| | $r_{16}=+122.05$ mm | | | |
| | | $d_7=7.50$mm | | |
| | $r_{17}=\infty$ | | | |
| $L_{10}$ | | $t_{10}=40.00$mm | 1.52600 | 58.8 |
| | $r_{18}=\infty$ | | | |
| | | (image surface) | | |

2. A photographic objective to be used during exposure or projection of supermicrofilm, said objective having from front to rear nine lenses designated $L_1$–$L_9$, wherein lenses $L_4$ and $L_5$ are cemented together and have a common surface of radius $r_8$ while lenses $L_6$ and $L_7$ are cemented together and have a common surface of radius $r_{11}$, wherein for a focal length of 100 mm for the entire lens system and an aperture ratio of 1:1.4, the objective has the data of the following Table III, in which the second column designates the radii of curvature of the successive lens surfaces, the third column designates the thicknesses $t$ of the successive lenses and the distance d therebetween while the glass constants in the last two columns are designated $n$ for the refractive index along the $d$-line and $v$ for the Abbe number:

TABLE III

| Lens | Focal Length=100 mm | Aperture Ratio 1:1.4 | Glass Constants | |
|---|---|---|---|---|
| | | | $n$ | $v$ |
| $L_1$ | $r_1=+521.24$ mm | | | |
| | | $t_1=12.46$mm | 1.51112 | 60.5 |
| | $r_2=+140.57$ mm | | | |
| | | $d_1=77.28$mm | | |
| | $r_3=+223.45$ mm | | | |
| $L_2$ | | $t_2=19.94$mm | 1.77250 | 49.6 |
| | $r_4=-480.98$ mm | | | |
| | | $d_2=1.25$mm | | |
| | $r_5=+101.51$ mm | | | |
| $L_3$ | | $t_3=19.94$mm | 1.77250 | 49.6 |
| | $r_6=+160.04$ mm | | | |
| | | $d_3=1.25$mm | | |
| | $r_7=+63.27$ mm | | | |
| $L_4$ | | $t_4=24.43$mm | 1.77250 | 49.6 |
| | $r_8=+132.50$ mm | | | |
| $L_5$ | $r_9=+32.39$ mm | $t_5=14.33$mm | 1.80518 | 25.5 |
| | | $d_4=15.58$mm | | |
| | $r_{10}=-79.20$ mm | | | |
| $L_6$ | | $t_6=14.96$mm | 1.72151 | 29.3 |
| | $r_{11}=+43.39$ mm | | | |
| $L_7$ | | $t_7=19.94$mm | 1.80400 | 46.6 |
| | $r_{12}=-259.15$ mm | | | |
| | | $d_5=1.25$mm | | |
| | $r_{13}=+191.36$ mm | | | |
| $L_8$ | | $t_8=18.95$mm | 1.80400 | 46.6 |
| | $r_{14}=-384.24$ mm | | | |
| | | $d_6=1.25$mm | | |
| | $r_{15}=+85.76$ mm | | | |
| $L_9$ | | $t_9=17.45$mm | 1.83400 | 37.2 |
| | $r_{16}=+1836.31$ mm | | | |

* * * * *